US011989622B2

(12) United States Patent
Ebert et al.

(10) Patent No.: US 11,989,622 B2
(45) Date of Patent: May 21, 2024

(54) UNDER-RESOLVED QUANTUM-ARRAY STATE MAPPING

(71) Applicant: ColdQuanta, Inc., Boulder, CO (US)

(72) Inventors: Matthew Ebert, Madison, WI (US); Martin Tom Lichtman, Madison, WI (US)

(73) Assignee: ColdQuanta, Inc., Boulder, CO (US)

( * ) Notice: Subject to any disclaimer, the term of this patent is extended or adjusted under 35 U.S.C. 154(b) by 330 days.

(21) Appl. No.: 17/506,860

(22) Filed: Oct. 21, 2021

(65) Prior Publication Data

US 2022/0172855 A1 Jun. 2, 2022

Related U.S. Application Data

(60) Provisional application No. 63/119,726, filed on Dec. 1, 2020.

(51) Int. Cl.
| | | |
|---|---|---|
| *G06N 10/00* | (2022.01) | |
| *G06F 9/30* | (2018.01) | |
| *G21K 1/00* | (2006.01) | |

(52) U.S. Cl.
CPC ......... *G06N 10/00* (2019.01); *G06F 9/30101* (2013.01); *G21K 1/006* (2013.01)

(58) Field of Classification Search
CPC ..... G06N 10/00; G06F 9/30101; G21K 1/006
See application file for complete search history.

(56) References Cited

U.S. PATENT DOCUMENTS

| | | |
|---|---|---|
| 2016/0071021 A1 | 3/2016 | Raymond |
| 2018/0285760 A1 | 10/2018 | Abdo |
| 2019/0064456 A1 | 2/2019 | Kim |

FOREIGN PATENT DOCUMENTS

WO 2020236574 11/2020

OTHER PUBLICATIONS

So et al., Two-Photon Fluorescence Light Microscopy, Encyclopedia of Life Sciences, 2002 Macmillan Publishers Ltd., Nature Publishing Group, pp. 1-5.

*Primary Examiner* — Nicole M Ippolito
*Assistant Examiner* — Hanway Chang
(74) *Attorney, Agent, or Firm* — Van Pelt, Yi & James LLP; Clifton Leon Anderson

(57) ABSTRACT

A quantum register can be read out using under-resolved emissions mapping (e.g., imaging). Regions of the quantum register are illuminated concurrently, one array site per region at a time, typically until all sites of each region have been illuminated. A photodetector system then detects for each region whether or not an EMR emission (e.g., due to fluorescence) has occurred in response to illumination of a respective site in that region. The result of the photo detections is a series of emissions maps, e.g., images. The number of emissions maps in the series corresponds to a number of sites per region, while the number of pixels in each image corresponds to a number of regions. A readout result can be based on a time-multiplexed combination of these emissions maps. The emissions maps are under-resolved since the resolution corresponds to the region size rather than the sizes of individual array sites.

10 Claims, 7 Drawing Sheets

UNDER-RESOLVED QUANTUM-ARRAY STATE MAPPING

BACKGROUND

Whereas classical digital computers manipulate units, e.g., bits, of classical information, quantum computers manipulate units, e.g., qubits, of quantum information. Both classical bits and quantum qubits can be represented physically using two-state carriers. Examples of two-state quantum carriers include an electron that can transition between a spin up and a spin down state, and an electron in an atom that can transition between a ground state and an excited state. A classical two-state carrier assumes one of the two states at any given time; a quantum two-state carrier can be in a coherent superposition of both states simultaneously.

Quantum computers vary in the underlying technology used to physically represent the qubits; thus, depending on the underlying technology, the quantum-state carriers can be cold-neutral atoms, ions, other molecular entities, superconducting circuits, quantum dots, nitrogen-vacuum centers in diamond, or other entities. One of the advantages of using cold neutral atoms or ions is that atoms of the same element and atomic weight are naturally identical so that manufacturing tolerances are not an issue (as they may be when the qubits are defined in states of superconducting circuits). Another advantage of cold neutral atoms is that they can be packed closely together without interacting, in contrast to, for example, ions. On the other hand, neighboring cold atoms can be made to interact, e.g., by causing them to enter Rydberg (very high excitation) states. Thus, cold atoms readily provide for relatively large qubit-count quantum registers.

In a cold neutral atom register, atoms are held in a one-, two-, or three-dimensional optical array trap, e.g., formed as a lattice of crisscrossing laser beams. During computation, the atoms can, at least in principle, assume any of a continuum of quantum values. However, the process of reading out quantum-computation results causes the continuum of quantum states to collapse to a pair of binary values: upon readout, each atom either represents a zero (e.g., corresponding to a ground state) or unity (e.g., corresponding to a low-level excited state). The collapsing is probabilistic in that two QSCs having the same superposition state can collapse to different non-superposition (i.e., eigen) states.

One approach to readout involves illuminating the atoms so that they emit light on a quantum-state-dependent basis. (In some variations, illumination is used to eject atoms on a quantum-state-dependent basis, and further illumination is used to trigger emissions to identify the remaining atoms.) A photodetector system can then be used to determine which atoms in a quantum register emit light; the quantum state and the associated value can then be determined from the presence versus absence of emissions.

The photo-detection is required to uniquely associate emissions with atom site positions in any detection scheme. When detecting emission from all sites in parallel, there must be at least one photodetector element ("pixel") per site and negligible crosstalk signal from other atom sites. The signal-to-noise ratio is optimal for a single detector per atom site position due to intrinsic per-pixel noise, however, alignment of the photodetector is critical and can be challenging. Consider, for example, a hexagonal atom site position lattice that doesn't map perfectly to all pixels. Using a higher-resolution sensor to oversample the register can address the alignment problem since image analysis can determine the proper alignment; however, there is a tradeoff in computational complexity; in addition, the signal-to-noise ratio is reduced due to multiple photodetector elements. So, what is needed includes increased alignment tolerances and higher signal-to-noise ratios.

DETAILED DESCRIPTION

The present invention provides for parallel time-multiplexed under-resolved emissions mapping, e.g., imaging, of a quantum array to achieve quantum-state readouts with relaxed alignment tolerances and high signal-to-noise ratios. The emissions mapping is "under-resolved" in the sense that the detector resolution is insufficient to resolve individual atom/array sites of an array. In other words, the resolution is too coarsew to resolve individual array sites. Instead, the resolution matches regions of plural sites each; for example, the regions can be square blocks of 4, 9, 16, etc., sites each. To compensate for the under-resolved emissions mapping, the sites of a region are illuminated one at a time so it can be assumed that any detected emissions from a region originate from the currently or most recently illuminated site.

Since the sites of a region are imaged one at a time, the invention requires a separate emissions map for each site of a region, the number of emissions maps is at least as large as the maximum number of sites in a region. The number of emissions maps required can be minimized by processing all regions in parallel. The emissions maps can be images, e.g., taken using a camera sensor, or time series signals from a Single Photon Avalanche Sensor (SPAD), a Single-Photon Counting Module (SPCM), or super conducting nano-wire based "pixels". A quantum-state or logic-value readout can be based on the captured series of emissions maps.

Compared to readout processes in which sensor resolution matches site size, the present invention provides higher signal-to-noise ratios and relaxed detector alignment constraints. Also, since there is no need to resolve emissions from adjacent sites, the spacing of sites can be less than the diffraction limit for the site emissions.

Figure 1:
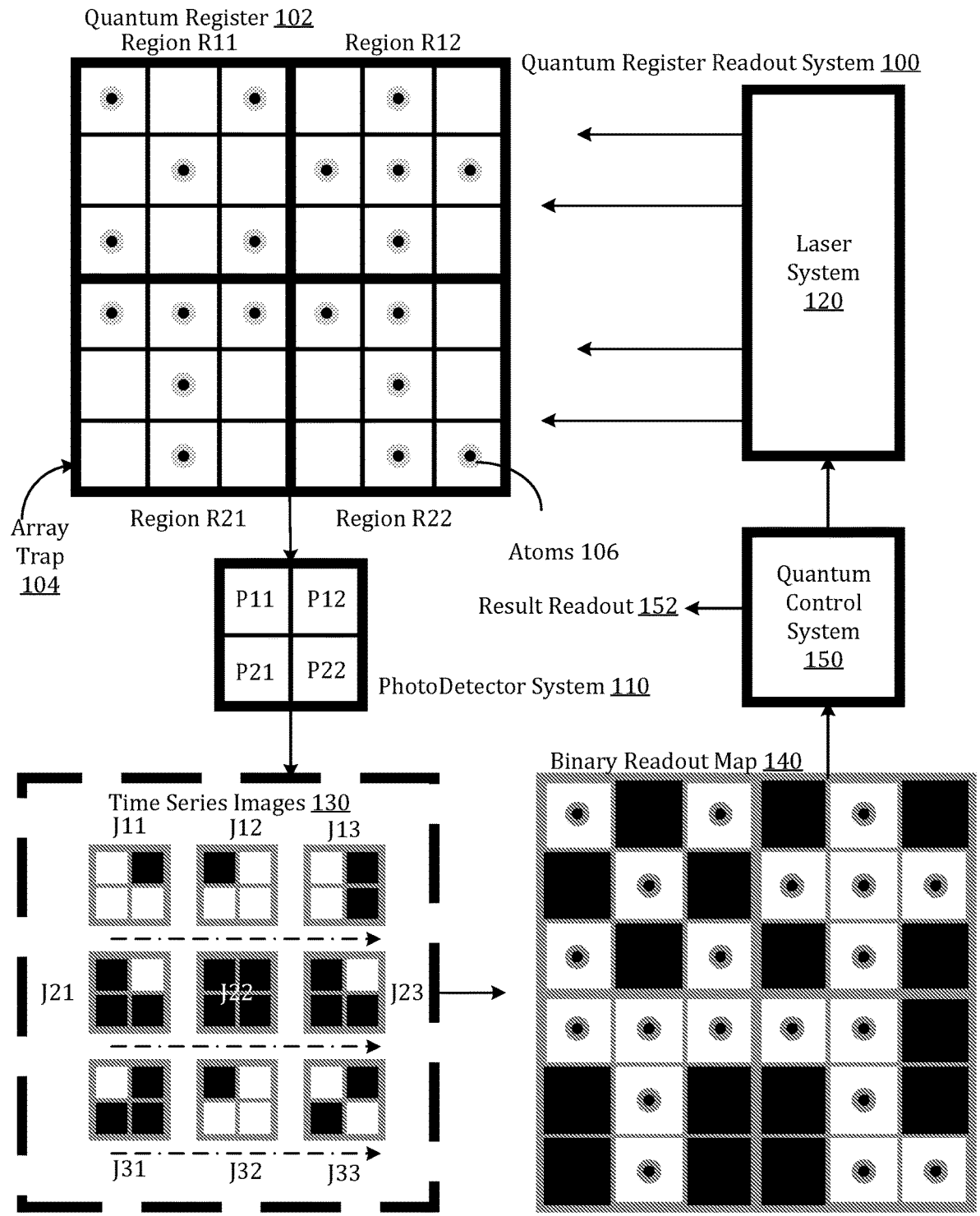
FIG. 1 is a schematic diagram of a quantum register readout system employing under-resolved imaging.

For example, as shown in FIG. 1, a quantum register readout system 100 includes a quantum register 102. During quantum computation, register 102 is populated with an array of quantum state carriers, e.g., cold atoms, distributed among respective sites of an array trap 104. (For expository purposes, a 6×6 array trap 104 is shown; in practice, much higher population arrays are used.) Once computation is complete, readout begins by ejecting atoms representing a binary zero (0), leaving only atoms 106 representing binary unity (1) in the array. These are the atoms shown in place in register 102 in FIG. 1. Alternatively, the atoms representing unity can be ejected so that only the atoms representing zero remain. In an alternative embodiment, the illumination is chosen so that it is absorbed only when the quantum state carrier (QSC) is in one quantum state; in that case, it is not necessary to eject QSCs in the other quantum state.

A readout can be performed using a photodetector system with one photodetector for each array site; for the illustrated register, a 36-detector system would be used. Noise from various sources including reflected excitation beams and crosstalk due to scattered fluorescence from neighboring array sites can mask the desired signal. The crosstalk component of noise can be readily exacerbated if there is any misalignment of the photodetector relative to the array trap.

Alternatively, a high-resolution imager with a many-to-one ratio of photodetectors to array sites can be used. This has the advantage of providing shape information that can aid in resolving atoms. However, this advantage is at least partially offset due to the intrinsic noise associated with each photodetector.

System 100 includes a photodetector system 110 with four photodetectors P11, P12, P21, and P22, one for each of four multi-site (3×3) regions R11, R12, R21, and R22 of register 102. One site is illuminated at a time within a region so that four sites (one in each of the four regions) are illuminated at a time. Since only one site per region is illuminated at a time, there is no intra-region crosstalk. Overall, there are at most three sources of crosstalk for each site and those sources tend to be relatively far removed from each other. This is in contrast to the one photodetector per site approach in which adjacent sites can be sources of crosstalk and the total number of possible sources of crosstalk for a site is 26 (the number of other sites in the register). Accordingly, noise due to crosstalk is substantially reduced. Likewise, noise due to reflections of excitation beams is minimized as these are directed only at four sites at a time as opposed to 36.

Readout system 100 includes a laser system 120 that illuminates one array site per array region at a time. Laser system 120 can scan all four regions in parallel to reduce readout time, thus reducing the risk of information loss due to quantum state decoherence. Smaller regions offer more parallelism and thus faster readout, provided the laser system can scan the increased number of regions in parallel.

Laser system 120 scans regions R11-R22 in parallel so a complete register readout cycle results in a time series 130 of images J11-J33. Each time series image includes four pixels, one for each register region R11-R22. Each register region includes nine sites labelled S11-S33 in FIG. 2. Thus, in FIG. 2, there are four sites labelled S11, one in each region R11-R22. Image J11 (FIGS. 1 and 2) has a white upper left pixel (picture element) corresponding to the presence of an atom in the upper left site S11 of region R11. Image J11 has a black upper right pixel corresponding to the absence of an atom in the upper left site S11 of region R12. The bottom two white pixels of image 111 respectively indicate the presence of atoms in the upper left sites S11 of regions R21 and R22. Similarly, the pixels of image J12 respectively represent the presence or absence of atoms in the upper center sites S12 of regions R11-R22. The information contained in images J11 to J33 can be used to construct a binary readout map 140 (FIG. 1). Depending on the scenario, this map can serve as a computation result. Alternatively, a control system 150 can determine a result readout 152 based on binary readout map 140.

Figures 2, 3:
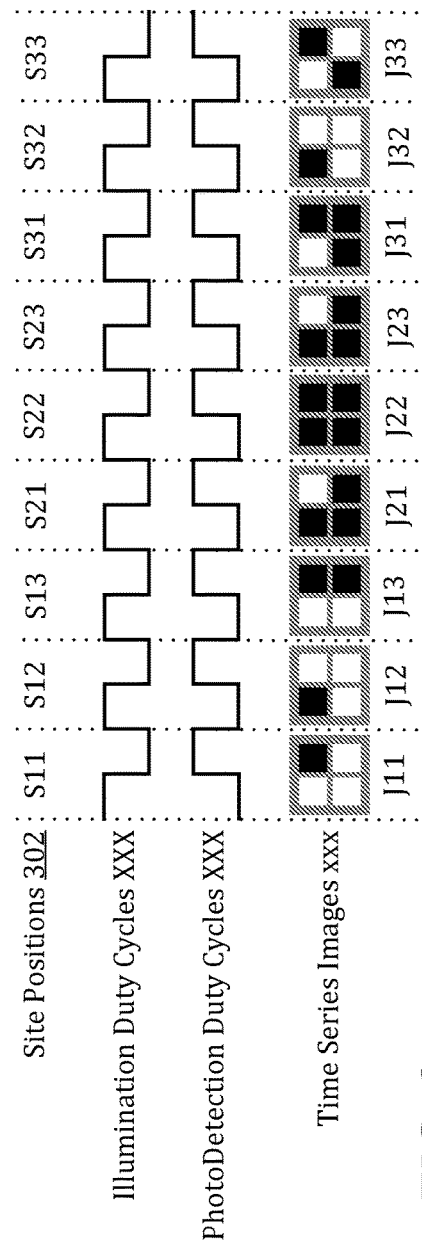
FIG. 2 is a schematic diagram of a quantum register of the system of FIG. 1 labeling positions of atoms within register regions.
FIG. 3 is a timing diagram representing gated illumination and photodetection duty cycles.

Register readout using gated illumination and photodetection is charted in FIG. 3. One full readout cycle includes nine (one per site in a region) site-position subcycles corresponding to the nine site positions 302. The illumination duty cycles 304, the photodetection duty cycles 306, and the resulting image, e.g., one of J11-J33, are shown for each site-position subcycle. Each subcycle begins with illumination on and photodetection off, followed by illumination off and photodetection on. The purpose of the gating is to prevent noise due to illumination from being detected and interfering with fluorescence/phosphorescence detections. As discussed further below, in some variations, gating is not used so that illumination must be excluded from the photodetectors in some other way, e.g., using spatial, spectral and/or polarization filtering.

Figure 4:
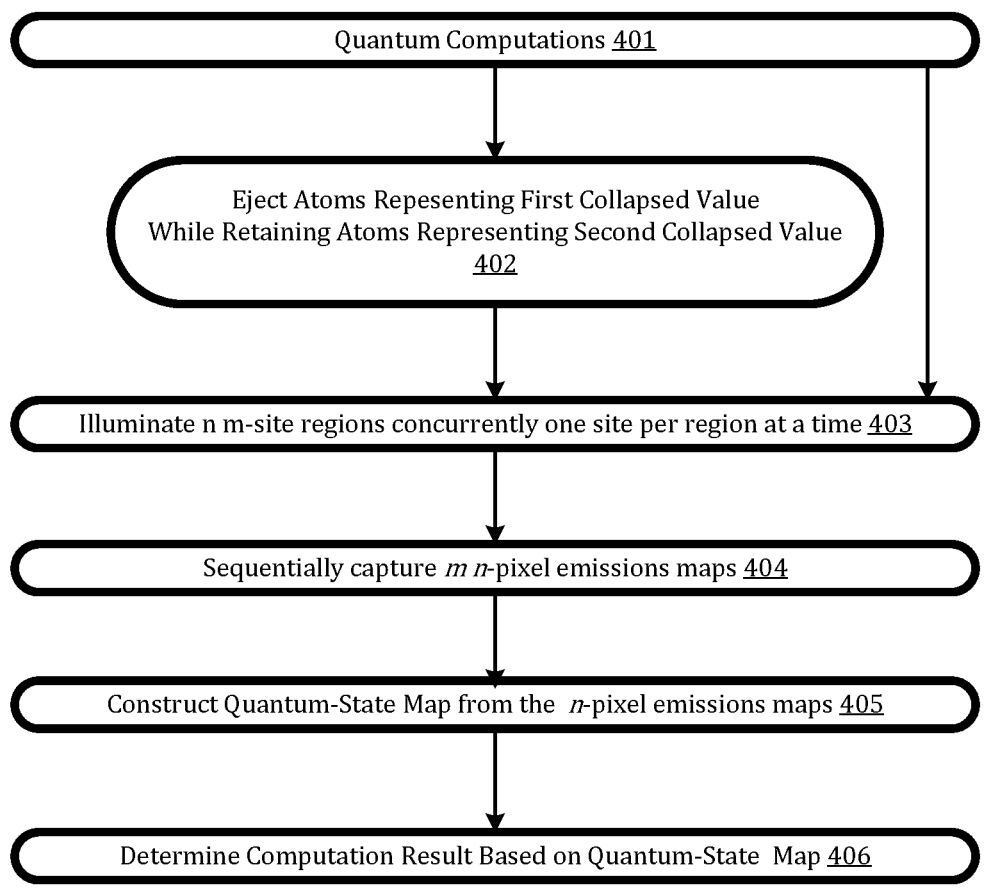
FIG. 4 is a flow chart of an atom array readout process implementable in the system of FIG. 1 and in other systems.

A quantum-state readout process 400 is flow charted in FIG. 4. At 401, quantum computations leave at least some atoms of a quantum register in unknown quantum states. Quantum computation can require lasers or other illumination that can address individual sites of a quantum register. The present invention leverages this illumination precision to relax alignment constraints on the photodetector system. In some embodiments, at 402, a state-selective ejection process causes those atoms that collapse to a first non-superposition state (e.g., representing logic 0) to be ejected from the quantum register, which retains atoms that have collapsed to a second non-superposition state (e.g., representing logic 1). In some embodiments, action 402 is omitted.

At 403, the n m-site regions are illuminated, where n is the number of regions and m is the (maximum) number of sites per region. Each region is illuminated one site at a time. At least for the most part, the regions are illuminated concurrently. The illumination is chosen to cause the atoms remaining after action 402 to emit electro-magnetic radiation, e.g., employing fluorescence, phosphorescence, and/or four-wave mixing. At 404, the emissions are captured, e.g., using photodetectors. The result is a series of m n-pixel images, each corresponding to a respective site position with a region of the quantum register.

At 405, a quantum-state map is constructed from the resulting m n-pixel images. At 406, the computation result is determined from the quantum-state map. Alternatively, the computation result can be determined directly from the m n-pixel images without explicitly constructing the quantum-state map.

Figure 5A:
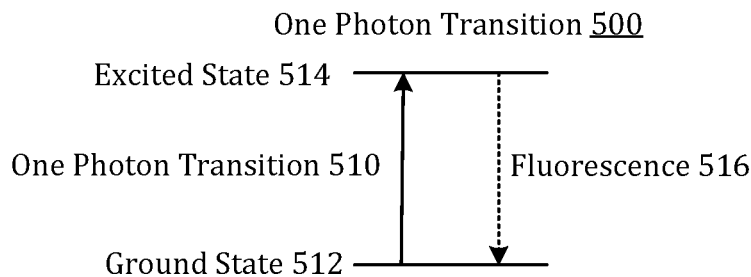
FIGS. 5A, 5B, 5C, and 5D are energy-level diagrams corresponding to various illumination/emissions schemes implementable in the system of FIG. 1.

Several technologies, some of which are represented in FIGS. 5A-5D, are available for illuminating an atom. FIG. 5A is an energy-level diagram representing illumination using a single wavelength. Absorption of this wavelength can cause an atom in a respective quantum state to undergo a "one-photon" transition 510 from a ground state 512 to an excited state 514. Some random time after this transition, the atom spontaneously fluoresces 516 a photon of the same wavelength and returns to ground state 512. The illumination and photodetection can be gated so that the illumination does not contribute noise to the emission detection.

Figure 5B:
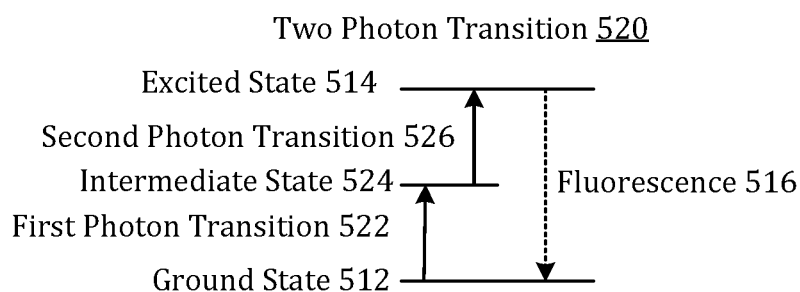

FIG. 5B is an energy-level diagram of a two-photon transition 520. The illumination includes two wavelengths, one resonant with a first photon transition 522 from ground state 512 to an intermediate state 524, and the other wavelength resonant with a second photon transition 526 from intermediate state 524 to an excited state 514. Together the illumination with two wavelengths achieves the same transition as one-photon transition 510 of FIG. 5A, and the resulting fluorescence 516 from excited state 514 back to ground state 512 matches the fluorescence transition for FIG. 5A.

Compared to the one-photon transition of FIG. 5A, the illumination for the two-photon transition of FIG. 5B uses longer wavelengths, lower frequencies, and lower energies. As a result, the target atom is less likely to be ejected or otherwise perturbed by the two-photon illumination. Since the wavelengths used for two-photon illumination are quite different from the fluorescence wavelength (which can be the same as the wavelength of the one-photon illumination), spectral filtering can be used (in addition to or in lieu of gating) to reduce noise in the detections of the fluorescence emissions. Alternative embodiments use illumination for triggering three-or-more photon transitions.

Just as the number of steps in the upward illumination transition can vary from one to two to three and more, so can the number of steps in the downward transition vary. A multi-step return transition 530 is featured in FIG. 5C. A one-photon transition 532 transitions from ground state 512 to a quadrupole state 534, e.g., a 4d state for cesium 133. Subsequently, the atom undergoes a transition 536 from the quadrupole state 534 to a dipole state 538, e.g., a 4p state for cesium 133. Finally, a fluorescence emission 539 transitions the atom from dipole state 538 to ground state 512. Depending on the relative wavelengths of the one-photon transition and the fluorescence, spectral filtering can reduce noise in the photodetection due to illumination. Other embodiments leverage return transitions with more than two steps.

Figure 5C:
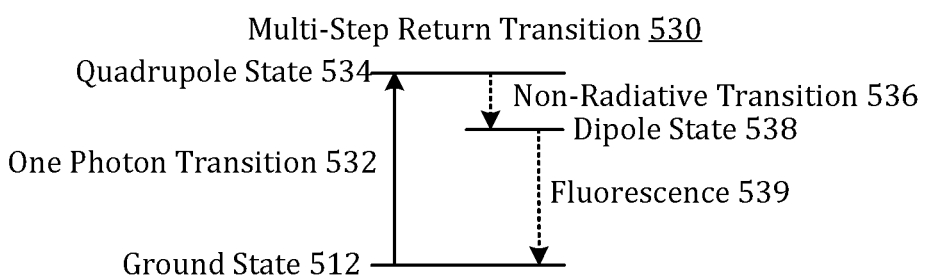
Figure 5D:
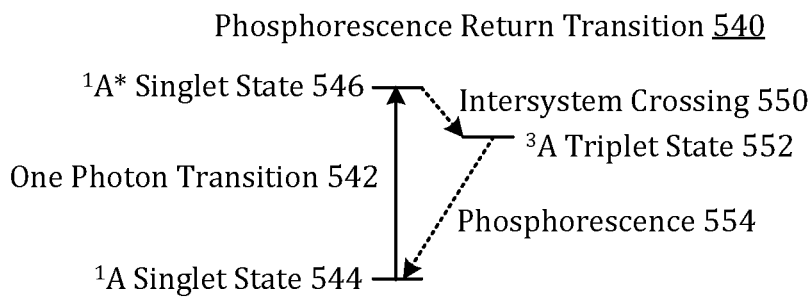

The examples of FIGS. 5A-C, provide fluorescence outputs. A phosphorescence return transition 540 is diagrammed in FIG. 5D. A one-photon transition 542 takes the atom from a 1A singlet state 544 to a 1A* singlet state 546. An inter-system crossing 550 results in a transition from the 1A* singlet state 546 to a 3A triplet state 552. A transition accompanied by phosphorescence 554 returns to the 1A singlet state 544 from the 3A triplet state. The delay between illumination and emission is generally greater for phosphorescence than it is for fluorescence. The greater delay relaxes timing tolerances for gating (temporal filtering) in reducing the impact of illumination on photodetection. However, the additional delay can lower readout performance, so there is this tradeoff to consider.

Figure 6:
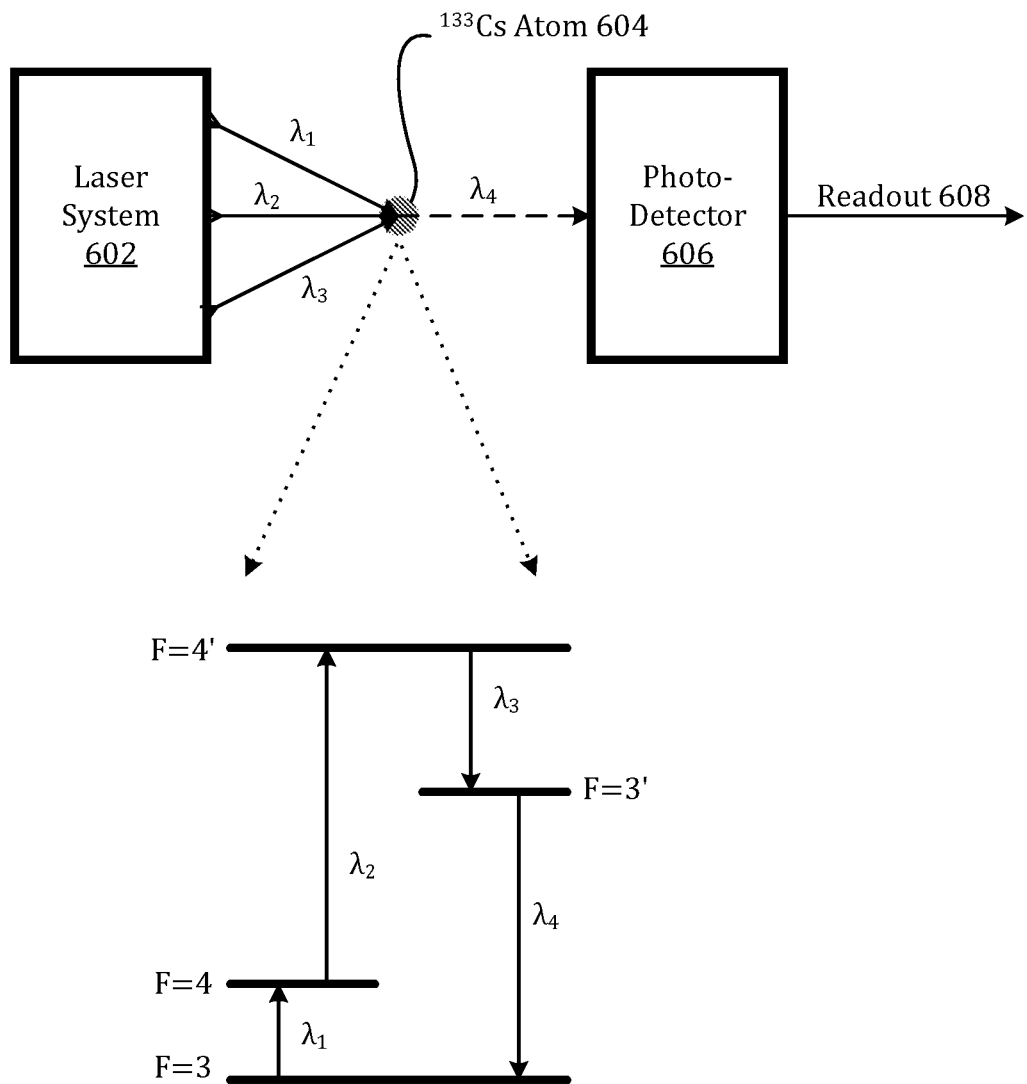
FIG. 6 is a schematic diagram of an illumination/emissions system scheme implementable in the system of FIG. 1.

A four-wave mixing quantum-state readout system 600, shown in FIG. 6, includes a laser system 602 that illuminates a cesium 133 ($^{133}$Cs) atom 604 with three wavelengths $\lambda_1$, $\lambda_2$, and $\lambda_3$, e.g., 1061 nanometers (nm), 459 nm, and 1040 nm. Wavelength $\lambda_1$ is resonant with an F=3→F=4 transition for $^{133}$Cs; wavelength $\lambda_2$, is resonant with an F=4→F=4' transition, and wavelength $\lambda_3$ is resonant with an F=4'→F=3' transition. These wavelengths and their angles of incidence at atom 604 are chosen so that atom 604 emits a fourth wavelength $\lambda_4$ in the event that atom 604 is in its F=3 state (and not when it is in its F=4 state). Accordingly, a positive detection by a photodetector 606 indicates the atom is in its F=3 state, while a non-detection indicates the atom is in its F=4 state (assuming no error conditions). Accordingly, readout 608 from photodetector 606 can distinguish states representing a logic 0 from states representing a logic 1, even if no atoms have been ejected from the register.

While the foregoing description focuses on atoms in general and $^{133}$Cs in particular, the invention also provides for other isotopes of cesium (e.g., $^{135}$Cs), atoms of other elements (e.g., rubidium and strontium), other molecular entities (e.g., ions and polyatomic molecules), and other quantum-state carriers (e.g., quantum dots, superconducting circuits, and nitrogen-vacuum centers that emit light or other electromagnetic radiation (EMR) in response to receiving EMR. There are many wavelengths and sets of wavelengths that meet the requirements for resonance with transitions associated with EMR emissions. While quantum-state readout process 400 (FIG. 4) provides for ejecting atoms from a quantum register, embodiments in which the emissions are quantum-state dependent, e.g., as in the four-wave mixing embodiment of FIG. 6, do not require ejection.

Figure 7:
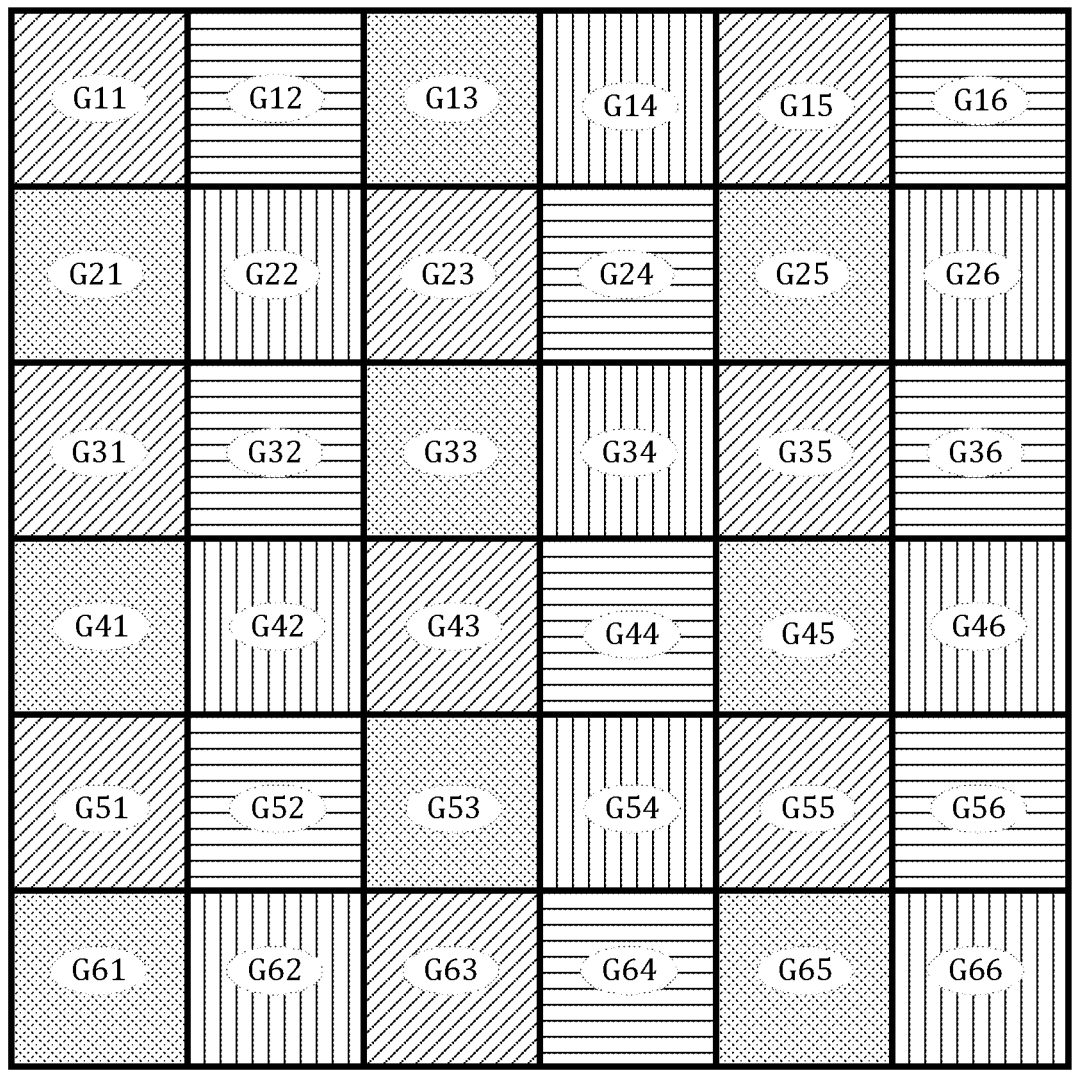
FIG. 7 is a four-color map for use in minimizing inter-region crosstalk in the system of FIG. 1.

The present invention applies to systems in which quantum-state carriers (QSCs) are arranged at individually addressable sites in an array. In some embodiments, the same combination of illumination wavelengths and emissions wavelengths are applied to all sites. In other embodiments, different combinations of illumination wavelengths are applied to different sites or groups of sites and different emissions wavelengths can result. For example, four different emissions can be selected to be spatially, temporally, spectrally, and/or polarization filtered from each other; in that case, emissions can be assigned to regions such that emissions from neighboring regions can be separated so as to reduce inter-region crosstalk. See FIG. 7 in which four different shadings, respectively represent four different emissions wavelengths, are applied to regions G11-G66 so that no two adjacent regions have the same emissions wavelengths.

Figure 8:
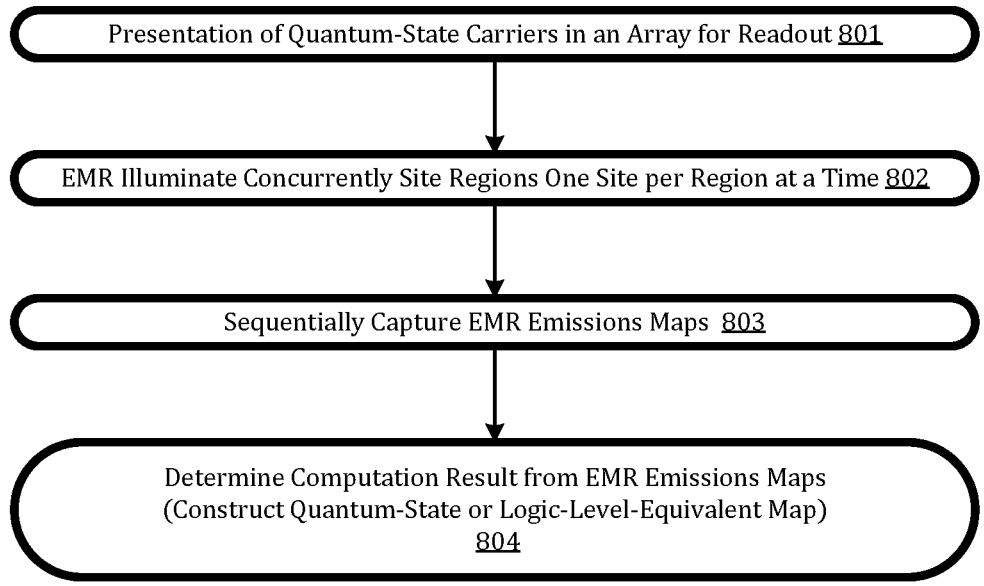
FIG. 8 is a flow chart of a quantum-array readout process implementable in the system of FIG. 1 and in other systems.

Accordingly, a quantum-state readout process 800, flow charted in FIG. 8, begins with presentation of quantum-state carriers (QSCs) in an array at 801. In some variations, some QSC's may have been ejected on a quantum-state selective basis so that the quantum state of any QSC emitting EMR can be assumed to not be the state of the ejected QSCs. In other variations, the emissions are dependent on the quantum state of the QSCs so it is not necessary to eject QSCs to prepare for readout.

At 802, the regions are illuminated one site at a time. In other words, there is a site sequence for each region. The site sequences (and thus the regions) are illuminated concurrently. Illuminating all regions concurrently can achieve the fastest readout performance. However, the invention provides for as few as two regions being illuminated in parallel (i.e., concurrently). In an example in which the number of regions exceeds the capacity of the laser or other illumination system, the regions can be grouped and the regions in a group can be illuminated in parallel, while regions in different groups may be illuminated at different times.

At 803, EMR emissions maps are captured sequentially. For example, one emissions map representing all or multiple regions is captured for each parallel illumination. Typically, this would be one image per site position shared by all regions or shared by all regions in a group to be illuminated in parallel. Regions at the edges of an array can have different sizes and shapes, e.g., when the region dimensions are not commensurate with the array dimensions.

At 804 the respective quantum states of the QSCs are determined based on the sequence of EMR emissions maps. One way to do this is to construct an EMR map corresponding to the entire array based on the sequence of EMR emissions maps, convert this map into a quantum-state map, and convert the quantum-state map into a logic-level readout. However, the invention provides for mathematically equivalent procedures for reaching the same readout that do not involve constructing quantum-state maps.

Herein, "illuminate" means "expose to electro-magnetic radiation". In the illustrated embodiments, the electro-magnetic radiation (EMR) includes visible and near infra-red light produced by lasers. However, other embodiments use EMR with wavelengths above and below (e.g., ultraviolet light) this range and produced by sources other than lasers. Herein, a "quantum-state carrier" or "QSC" is any entity that can assume two or more quantum states. Examples of QSCs include atoms, other molecular entities (e.g., ions, poly-atomic molecules), photons, superconducting circuits, quantum dots, and nitrogen-vacuum centers.

The illustrated quantum registers are formed using optical array traps, e.g., formed using orthogonal sets of laser beams, interference patterns, and/or optical tweezers. Herein, a "region of an array" consists of a contiguous subset of sites of the array. In the illustrated embodiments, the regions collectively encompass all sites of an array. Depending on the embodiment, all regions of an array can be illuminated in parallel or as few as two at a time can be illuminated in parallel. "In parallel" does not require synchronicity; however, the timings must be such that multi-region emissions maps can be captured.

The invention calls for "under-resolved" emissions mapping (e.g., imaging), meaning that the resolution is too low (i.e., too "coarse") to resolve adjacent array sites. Thus, a pixel that represents a captured emission cannot be used alone to identify the site from which the emission originated. The mapping/image data must be supplemented with information regarding which array site in the pixel's field of view was illuminated at the time the map/image was captured.

Herein, detector resolution and the resolution of images produced by the photo-detector system corresponds more closely, percentage-wise, to the size of a region than to the size of a site. For example, if the pitch of the sites in quantum register 102 (FIG. 1) is two microns (2 µm), the site size is 2 µm by 2 µm. Regions R11-R22 have dimensions of 6 µm by 6 µm. In that case, the detector and map/image resolution is closer percentage-wise to 6 µm than 2 µm; in other words the resolution is greater than 3 µm rather than less than 3 µm. (3 µm is 50% greater than 2 µm and 50% less than 6 µm; so 3 µm is the equipoise in this example.)

Herein, all art labelled "prior art", if any, is admitted prior art; all art not labelled "prior art", if any, is not admitted prior art. The illustrated embodiments, variations thereupon and modifications thereto are provided for by the present invention, the scope of which is defined by the following claims.

What is claimed is:

1. A quantum-state readout process comprising:

illuminating with electro-magnetic radiation (EMR) plural regions of an array trap for quantum-state carriers (QSCs), the array trap defining plural array sites for containing QSCs, each of the regions including plural ones of the array sites, each region being illuminated one site at a time, each of the QSCs having first and second quantum states, each of the QSCs, when in its first quantum state, emitting EMR in response to illumination of the respective array site;

sequentially capturing emissions maps indicating for each of the regions whether or not EMR was being emitted during the time that emissions map was captured, each of the emissions maps having a respective resolution too coarse to resolve adjacent array sites of the array; and providing a readout of the array trap based on identification of array sites containing QSCs in the first quantum state, the identification being based on the emissions maps.

2. The quantum-state readout process of claim 1 wherein the illumination EMR and the emissions EMR are infrared, visible, or ultraviolet light, the array trap is an optical trap, the QSC is an atom, and the emissions are fluorescence, phosphorescence or the result of four-wave mixing, and the first quantum state is an energy level of the atom.

3. The quantum-state readout process of claim 1 wherein the capturing involves spectral, spatial, temporal, or polarization filtering of the emitted EMR.

4. The quantum-state readout process of claim 1 further comprising:

prior to the illuminating, performing a quantum computation by causing the QSCs to interact; and determining a result of the quantum computation based on the identifying.

5. The quantum-state readout process of claim 4 wherein two QSCs that were in the same quantum state upon completion of the quantum computation emit EMR of different wavelengths during the capturing.

6. A quantum-state readout system comprising:

an illumination system for illuminating with electro-magnetic radiation (EMR) plural regions of an array trap for quantum-state carriers (QSCs), the array trap defining plural array sites for containing QSCs, each of the regions including plural ones of the array sites, each region being illuminated one site at a time until all array sites of the region have been illuminated, each of the QSCs having first and second quantum states, each of the QSCs, when in its first quantum state, emitting EMR in response to illumination of the respective array site;

an emissions capture system for sequentially capturing emissions maps indicating for each of the regions whether or not EMR was being emitted during the time that emissions map was captured, each of the emissions maps having a respective resolution too coarse to resolve adjacent array sites of the array; and an emissions map processing system for providing a readout of the array trap based on identification of array sites containing QSCs in the first quantum state, the identification being based on the emissions maps.

7. The quantum-state readout system of claim 6 wherein the illumination system includes lasers, the illumination EMR and the emissions EMR are infrared, visible, or ultraviolet light, the array trap is an optical trap, the QSC is an atom, and the emissions are fluorescence, phosphorescence or the result of four-wave mixing, and the first quantum state is an energy level of the atom.

8. The quantum-state readout system of claim 6 wherein the capturing involves spectral, spatial, temporal, or polarization filtering of the emitted EMR.

9. The quantum-state readout system of claim 6 further comprising a quantum processor for, prior to the illuminating, performing a quantum computation by causing the QSCs to interact, wherein the readout is a result of the computation.

10. The quantum-state readout process of claim 9 wherein two QSCs that were in the same quantum state upon completion of the quantum computation emit EMR of different wavelengths during the capturing.

* * * * *